(12) United States Patent
Cho et al.

(10) Patent No.: US 10,563,031 B2
(45) Date of Patent: Feb. 18, 2020

(54) POLYESTER FILM AND MANUFACTURING METHOD THEREOF (71) Applicant: KOLON INDUSTRIES, INC., Gwacheon-si, Gyeonggi-do (KR)

(72) Inventors: Eun Hye Cho, Gyeonggi-do (KR); Jae Bong Park, Gyeonggi-do (KR); Sang-Hyun Baek, Gyeonggi-do (KR)

(73) Assignee: KOLON INDUSTRIES, INC., Seoul (KR)

( * ) Notice: Subject to any disclaimer, the term of this patent is extended or adjusted under 35 U.S.C. 154(b) by 119 days.

(21) Appl. No.: 15/305,695

(22) PCT Filed: Apr. 29, 2015

(86) PCT No.: PCT/KR2015/004277
§ 371 (c)(1),
(2) Date: Oct. 21, 2016

(87) PCT Pub. No.: WO2015/167235
PCT Pub. Date: Nov. 5, 2015

(65) Prior Publication Data
US 2017/0044339 A1    Feb. 16, 2017

(30) Foreign Application Priority Data

Apr. 30, 2014  (KR) .................. 10-2014-0052185
Apr. 27, 2015  (KR) .................. 10-2015-0058906

(51) Int. Cl.
C08J 7/06      (2006.01)
C09D 7/40     (2018.01)
(Continued)

(52) U.S. Cl.
CPC .............. C08J 7/065 (2013.01); B05D 3/12 (2013.01); B05D 7/04 (2013.01); B05D 7/24 (2013.01);
(Continued)

(58) Field of Classification Search
None
See application file for complete search history.

(56) References Cited

U.S. PATENT DOCUMENTS 4,277,287 A * 7/1981 Frye .................. C09D 183/04
                                                106/287.12
4,348,431 A * 9/1982 O'Malley ............... C08J 7/047
                                                106/287.14
(Continued)

FOREIGN PATENT DOCUMENTS

KR       10-0785230 B1   12/2007
KR    10-2008-0084347 A   9/2008
(Continued)

OTHER PUBLICATIONS

European Patent Office communication dated Dec. 5, 2017 in counterpart application No. 15785260.9.
(Continued)

Primary Examiner — Vivian Chen
(74) Attorney, Agent, or Firm — Sughrue Mion, PLLC (57) ABSTRACT The present invention relates to a transfer polyester film. More particularly, the present invention relates to a transfer polyester film and a method for manufacturing the same, wherein the transfer polyester film has a coating layer with an excellent releasing property so that at the time of forming a hard coating layer in order to impart a surface gloss to an interior product, the transfer polyester film may be attached to a surface of the hard coating layer so as to allow the surface of the hard coating layer to be smoothly formed in a step of coating and curing a hard coating solution and may be removed after completely curing the hard coating layer.

14 Claims, 6 Drawing Sheets (51) Int. Cl.

| | | |
|---|---|---|
| C09D 7/63 | (2018.01) | |
| C09D 7/61 | (2018.01) | |
| B29C 48/08 | (2019.01) | |
| B29C 48/00 | (2019.01) | |
| B29C 55/00 | (2006.01) | |
| B29C 55/14 | (2006.01) | |
| C09D 1/00 | (2006.01) | |
| C09D 5/02 | (2006.01) | |
| C08J 7/04 | (2006.01) | |
| C08J 5/18 | (2006.01) | |
| B05D 3/12 | (2006.01) | |
| B05D 7/04 | (2006.01) | |
| B05D 7/24 | (2006.01) | |
| B29K 67/00 | (2006.01) | |
| B29K 105/16 | (2006.01) | |
| B29C 71/02 | (2006.01) | |
| C08J 7/00 | (2006.01) | |
| C09D 7/20 | (2018.01) | |
| C09D 7/60 | (2018.01) | |
| C08K 5/541 | (2006.01) | |
| C08K 3/36 | (2006.01) | |
| C08K 5/5415 | (2006.01) | |
| C08K 5/544 | (2006.01) | |
| C08K 5/5435 | (2006.01) | |
| C08K 3/22 | (2006.01) | |
| C08K 5/54 | (2006.01) | |
| C08K 3/013 | (2018.01) | |
| C08K 5/5425 | (2006.01) | |
| C08K 3/20 | (2006.01) | |
| C08K 5/5419 | (2006.01) | |
| B32B 5/16 | (2006.01) | |

(52) U.S. Cl.
CPC ........ *B29C 48/0018* (2019.02); *B29C 48/022* (2019.02); *B29C 48/08* (2019.02); *B29C 55/005* (2013.01); *B29C 55/143* (2013.01); *C08J 5/18* (2013.01); *C08J 7/047* (2013.01); *C09D 1/00* (2013.01); *C09D 5/02* (2013.01); *C09D 7/61* (2018.01); *C09D 7/63* (2018.01); *C09D 7/67* (2018.01); *C09D 7/68* (2018.01); *B05D 2201/02* (2013.01); *B05D 2401/10* (2013.01); *B05D 2401/20* (2013.01); *B05D 2401/21* (2013.01); *B29C 48/00* (2019.02); *B29C 48/001* (2019.02); *B29K 2067/00* (2013.01); *B29K 2067/003* (2013.01); *B29K 2105/162* (2013.01); *B32B 5/16* (2013.01); *B32B 2264/10* (2013.01); *B32B 2264/102* (2013.01); *B32B 2307/748* (2013.01); *B32B 2367/00* (2013.01); *C08J 7/00* (2013.01); *C08J 7/04* (2013.01); *C08J 7/06* (2013.01); *C08J 7/08* (2013.01); *C08J 2367/02* (2013.01); *C08K 3/013* (2018.01); *C08K 3/20* (2013.01); *C08K 3/22* (2013.01); *C08K 3/36* (2013.01); *C08K 5/541* (2013.01); *C08K 5/544* (2013.01); *C08K 5/5406* (2013.01); *C08K 5/5415* (2013.01); *C08K 5/5419* (2013.01); *C08K 5/5425* (2013.01); *C08K 5/5435* (2013.01); *C08K 2003/2227* (2013.01); *C08K 2003/2237* (2013.01); *C08K 2003/2241* (2013.01); *C08K 2003/2244* (2013.01); *C09D 7/20* (2018.01); *C09D 7/40* (2018.01); *C09D 7/60* (2018.01); *Y10T 428/2495* (2015.01); *Y10T 428/24967* (2015.01); *Y10T 428/256* (2015.01); *Y10T 428/257* (2015.01); *Y10T 428/259* (2015.01); *Y10T 428/264* (2015.01); *Y10T 428/266* (2015.01); *Y10T 428/2839* (2015.01); *Y10T 428/31786* (2015.04)

(56) References Cited

U.S. PATENT DOCUMENTS

| | | | | |
|---|---|---|---|---|
| 4,539,351 A * | 9/1985 | O'Malley | ............ | C09D 183/04 106/177.1 |
| 4,624,870 A * | 11/1986 | Anthony | ................. | C08J 7/047 427/387 |
| 4,650,889 A * | 3/1987 | Plueddemann | ....... | C07F 7/1804 556/421 |
| 4,778,667 A * | 10/1988 | Garvey | ................... | C01B 33/16 423/335 |
| 4,898,786 A * | 2/1990 | Swofford | .......... | B32B 17/10018 428/480 |
| 4,939,035 A * | 7/1990 | Swofford | ................. | C08J 7/042 428/341 |
| 4,954,396 A * | 9/1990 | Swofford | ................. | C08J 7/042 156/244.24 |
| 5,022,944 A * | 6/1991 | Swofford | ................. | C08J 7/042 156/244.11 |
| 5,064,722 A * | 11/1991 | Swofford | .......... | B32B 17/10018 428/426 |
| 5,082,738 A * | 1/1992 | Swofford | .......... | B32B 17/10018 428/423.7 |
| 5,234,870 A * | 8/1993 | Osaka | ................. | B01J 13/0021 423/608 |
| 5,236,622 A * | 8/1993 | Yoneda | ................. | B82Y 30/00 516/33 |
| 5,304,324 A * | 4/1994 | Yoneda | ................. | B82Y 30/00 428/900 |
| 5,948,546 A * | 9/1999 | Bafford | ................... | B32B 27/30 156/326 |
| 6,090,482 A * | 7/2000 | Kawashima | ............. | C09J 7/201 428/353 |
| 6,132,861 A * | 10/2000 | Kang | ....................... | C09D 4/00 428/323 |
| 6,238,798 B1 * | 5/2001 | Kang | ....................... | C08F 2/44 427/487 |
| 6,245,833 B1 * | 6/2001 | Kang | ....................... | C09D 4/00 106/287.12 |
| 6,660,388 B2 * | 12/2003 | Liu | ....................... | C08F 2/44 428/421 |
| 7,087,672 B2 * | 8/2006 | Yuan | ...................... | C09D 167/00 427/388.4 |
| 2001/0024719 A1 * | 9/2001 | Lewis | ...................... | C08J 7/047 428/335 |
| 2001/0053445 A1 * | 12/2001 | Kang | ........................ | C09D 4/00 428/421 |
| 2002/0001710 A1 * | 1/2002 | Kang | ........................ | C08F 2/44 428/331 |
| 2002/0110647 A1 * | 8/2002 | Gust | ........................ | B05D 3/12 427/558 |
| 2002/0114934 A1 * | 8/2002 | Liu | ............................ | C08F 2/44 428/212 |
| 2004/0077768 A1 * | 4/2004 | Greenwood | ........... | B82Y 30/00 524/492 |
| 2004/0241469 A1 * | 12/2004 | McMan | ...................... | C08J 7/047 428/480 |
| 2006/0159909 A1 * | 7/2006 | Aslan | ....................... | C09D 5/18 428/323 |
| 2006/0167126 A1 * | 7/2006 | Goto | ........................ | C09D 4/00 522/81 |
| 2008/0131704 A1 * | 6/2008 | Mizuno | ................... | B32B 27/36 428/423.1 |
| 2011/0000397 A1 * | 1/2011 | Lortz | ...................... | B01F 17/0007 106/287.2 |
| 2011/0186792 A1 * | 8/2011 | Hirano | ..................... | C08K 3/22 252/589 |
| 2012/0103231 A1 * | 5/2012 | Ishihara | ................. | C01B 33/141 106/287.11 |
| 2013/0149497 A1 * | 6/2013 | Enniss | ...................... | B32B 19/02 428/150 |

(56) References Cited

U.S. PATENT DOCUMENTS

| | | | | |
|---|---|---|---|---|
| 2014/0005322 | A1* | 1/2014 | Akkerman | C08F 220/18 |
| | | | | 524/501 |
| 2015/0177433 | A1* | 6/2015 | Kumagai | B32B 7/02 |
| | | | | 359/359 |
| 2015/0259490 | A1* | 9/2015 | Jeong | C08G 18/6644 |
| | | | | 428/215 |

FOREIGN PATENT DOCUMENTS

| | | | |
|---|---|---|---|
| KR | 10-2014-0040947 A | | 4/2014 |
| KR | 10-2014-0042276 A | | 4/2014 |
| KR | 10-2014-0042418 A | | 4/2014 |
| WO | WO 2004/035474 A | * | 4/2004 |
| WO | 2014/051340 A1 | | 4/2014 |

OTHER PUBLICATIONS

International Searching Authority, International Search Report of PCT/KR2015/004277, dated Aug. 3, 2015. [PCT/ISA/210].

\* cited by examiner

POLYESTER FILM AND MANUFACTURING METHOD THEREOF

CROSS REFERENCE TO RELATED APPLICATIONS

This application is a National Stage of International Application No. PCT/KR2015/004277 filed Apr. 29, 2015, claiming priorities based on Korean Patent Application Nos. 10-2014-0052185, filed Apr. 30, 2014, and 10-2015-0058906, filed Apr. 27, 2015, the contents of all of which are incorporated herein by reference in their entirety.

TECHNICAL FIELD

The present invention relates to a transfer polyester film and a method for manufacturing the same. More particularly, the present invention relates to a transfer polyester film and a method for manufacturing the same, wherein the transfer polyester film has a coating layer with an excellent releasing property so that at the time of forming a hard coating layer in order to impart a surface gloss to an interior product, the transfer polyester film may be attached to a surface of the hard coating layer so as to allow the surface of the hard coating layer to be smoothly formed in a step of coating and curing a hard coating solution and may be easily removed after completely curing the hard coating layer.

BACKGROUND ART

Recently, in interior products such as furniture, a floor sheet, or the like, a hard coating layer is formed on a printing layer by coating a UV curable resin in order to impart a gloss to the printing layer.

The hard coating layer is formed by a method of applying the UV curable resin, completely curing the hard coating layer through a UV curing process in a state in which a transfer film is laminated thereon, and removing the transfer film, in order to allow the interior product to have a uniform and smooth surface.

In this case, the used transfer film should have an excellent releasing property from the hard coating layer and be easily laminated and removed.

DISCLOSURE

Technical Problem

An embodiment of the present invention is directed to providing a polyester film for a transfer film capable of being laminated on a hard coating layer at the time of forming the hard coating layer in order to impart surface gloss to an interior product to thereby allow the surface of the hard coating layer to be smoothly formed and having an excellent releasing property so as to be easily removed after completely curing the hard coating layer.

Another embodiment of the present invention is directed to providing a polyester film including a coating layer containing particles in order to allow a surface of a hard coating layer to be smoothly formed and have an excellent releasing property, and having an excellent dispersion property of the particles in the coating layer.

Technical Solution

In one general aspect, a polyester film includes: a base layer made of a polyester resin; and a coating layer stacked on one surface or both surfaces of the base layer, wherein the coating layer is formed using an aqueous coating composition containing coating an aqueous coating composition including (a) a composition containing a silane coupling agent of the following Chemical Formula 1 and (b) a dispersion solution containing inorganic particles on the base layer, and drying the coated composition; wherein said aqueous coating composition and the resulting coating layer do not include a polymer binder resin; and wherein a pH difference between (a) the composition containing a silane coupling agent and (b) the dispersion solution containing inorganic particles is less than 3, and the aqueous coating composition has a pH of 8 or more or 5 or less.

[Chemical Formula 1]

In Chemical Formula 1, X is a straight-chain, branched-chain, or cyclic $C_1$-$C_{12}$ hydrocarbon group having one or at least two functional groups selected from a vinyl group, an epoxy group, an amino group, a methacrylic group, an acrylic group, and a mercapto group, and $R_1$ to $R_3$ are each independently $C_1$-$C_5$ alkyl.

In another general aspect, a manufacturing method of a polyester film includes:

a) melt-extruding a polyester resin to manufacture a polyester sheet;

b) stretching the polyester sheet in a machine direction;

c) coating an aqueous coating composition containing (i) a composition containing a silane coupling agent represented by the following Chemical Formula 1 and (ii) a dispersion solution containing inorganic particles on one surface or both surfaces of the polyester sheet stretched in the machine direction to form a coating layer and stretching the coated polyester sheet in a transverse direction to give a bi-axially stretched polyester film; and d) heat-setting the bi-axially stretched polyester film. The aqueous coating composition and the resulting coating layer do not include a polymer binder resin.

[Chemical Formula 1]

In Chemical Formula 1, X is a straight-chain, branched-chain, or cyclic $C_1$-$C_{12}$ hydrocarbon group having one or at least two functional groups selected from a vinyl group, an epoxy group, an amino group, a methacrylic group, an acrylic group, and a mercapto group, and $R_1$ to $R_3$ are each independently $C_1$-$C_5$ alkyl.

In an embodiment, a pH difference between (i) the composition containing a silane coupling agent and (ii) the dispersion solution containing inorganic particles is less than 3; and the aqueous coating composition has a pH of 8 or more or 5 or less.

Advantageous Effects

The polyester film according to the present invention may have an excellent transferring property and releasing property to thereby be easily laminated and removed at the time of being used as a transfer film, and form a uniform and smooth coating layer.

BEST MODE

Hereinafter, exemplary embodiments will be provided in order to describe the present invention in more detail. However, the present invention is not limited to the exemplary embodiments.

In the case of using a polymer binder resin and inorganic particles at the time of forming a coating layer having a releasing property, there are problems in that even though a solid content is low, the transferring is not completely performed, and the binder resin has a high adhesion property with a hard coating layer, such that the releasing property may be deteriorated. Therefore, the present inventors have conducted studies in order to solve these problems, and as a result, the present inventors found that a coating layer having an excellent releasing property may be formed by binding particles using a silane coupling agent instead of the polymer binder resin and forming an organic-inorganic hybrid with a polyester base layer, thereby completing the present invention.

In addition, the present inventors found that in the case of forming a coating layer by an in-line coating method using the silane coupling agent, an adhesion property with the polyester base layer and surface smoothness were excellent, and aggregation of the particles was prevented, such that the coating layer was suitable for manufacturing a desired polyester film for a transfer film, thereby completing the present invention.

In addition, the present inventors found that at the time of manufacturing a film using an aqueous composition so that the composition may be in-line coated, a film having an excellent releasing property may be provided by adjusting a pH of the composition to be 8 or more or 5 or less to prevent aggregation of the particles and by adding particles under an environment in which the pH was adjusted to prevent aggregation of the particles, thereby completing the present invention.

In one aspect of the present invention, any silane coupling agent may be used without limitation as long as hydrolysis and a condensation reaction may be carried out, and it has a functional group serving as an anchor capable of being linked to used particles, more particularly, the inorganic particles.

In more detail, according to an aspect of the present invention, a polyester film includes a base layer made of a polyester resin and a coating layer stacked on one surface or both surfaces of the base layer, wherein the coating layer is formed by coating and drying an aqueous coating composition containing (i) a silane coupling agent represented by the following Chemical Formula 1 and (ii) a dispersion solution containing inorganic particles.

[Chemical Formula 1]

In Chemical Formula 1, X is a straight-chain, branched-chain, or cyclic $C_1$-$C_{12}$ hydrocarbon group having one or at least two functional groups selected from a vinyl group, an epoxy group, an amino group, a methacrylic group, an acrylic group, and a mercapto group, and $R_1$ to $R_3$ are each independently $C_1$-$C_5$ alkyl.

The aqueous coating composition and the coating layer do not include a polymer binder resin.

In one aspect of the present invention, the coating layer may contain 10 to 90 wt % of the particles.

In one aspect of the present invention, the particles may have an average particle size of 10 to 200 nm and be any one or at least two inorganic particles selected from silica, alumina, zirconia, and titania particles.

In one aspect of the present invention, the silane coupling agent represented by Chemical Formula 1 may be any one or at least two selected from the group consisting of [3-(2-aminoethylamino)propyl]trimethoxysilane, N-(2-aminoethyl-3-aminopropyl)triethoxysilane, vinyltrimethoxysilane, vinyltriethoxysilane, 3-acryloxypropyltrimethoxysilane, 3-acryloxypropyltriethoxysilane, 3-(meth)acryloxypropyltrimethoxysilane, 3-(meth)acryloxypropyltripropoxysilane, 3-aminopropyltrimethoxysilane, and 3-aminopropyltriethoxysilane, but is not necessarily limited thereto.

In one aspect of the present invention, the aqueous coating composition may contain an alcohol based solvent or water for performing hydrolysis or a condensation reaction.

In one aspect of the present invention, when a pH of the particle is alkaline, the aqueous coating composition may contain a pH adjusting agent for adjusting a pH of the entire composition to 8 or more, and when the pH of the particle is acidic, the aqueous coating composition may contain a pH adjusting agent for adjusting the pH of the entire composition to 5 or less.

In one aspect of the present invention, the coating layer may be coated by an in-line coating method.

In one aspect of the present invention, the coating layer may have a dried coating thickness of 10 to 500 nm, but is not limited thereto.

In one aspect of the present invention, the polyester film may have an entire thickness of 12 to 250 μm, but is not limited thereto.

Further, according to another aspect of the present invention, a manufacturing method of a polyester film includes:

a) melt-extruding a polyester resin to manufacture a polyester sheet;

b) stretching the polyester sheet in a machine direction;

c) coating an aqueous coating composition containing (i) a composition containing a silane coupling agent represented by the following Chemical Formula 1 and (ii) a dispersion solution containing inorganic particles on one surface or both surfaces of the polyester sheet stretched in the machine direction to form a coating layer and stretching the coated polyester sheet in a transverse direction, wherein said aqueous coating composition and the resulting coating layer do not include a polymer binder resin; and d) heat-setting the bi-axially stretched polyester film.

[Chemical Formula 1]

In Chemical Formula 1, X is a straight-chain, branched-chain, or cyclic $C_1$-$C_{12}$ hydrocarbon group having one or at least two functional groups selected from a vinyl group, an epoxy group, an amino group, a methacrylic group, an acrylic group, and a mercapto group, and $R_1$ to $R_3$ are each independently $C_1$-$C_5$ alkyl.

In an embodiment, a pH difference between (i) the composition containing a silane coupling agent and (ii) the dispersion solution containing inorganic particles is less than 3; and the aqueous coating composition has a pH of 8 or more or 5 or less.

Hereinafter, an aspect of the present invention will be described in detail.

The present invention is characterized in that the coating layer for imparting a transferring property and a releasing property to one surface or both surfaces of the polyester film is formed by the in-line coating method.

In the case in which the coating layer is formed on the polyester film by an off-line coating method, a process is added, and a coating thickness becomes thickened, such that cost may be increased as compared to the in-line coating method. Therefore, an object of the present inventors is to provide a polyester film capable of implementing excellent resistance against water and a solvent in addition to a thin coating thickness and strong adhesion force of the coating layer to the polyester film by coating the aqueous coating composition for forming a coating layer dried and cured in a stretching process using the in-line coating method.

In the present invention, the base layer may be a film made of the polyester resin. In more detail, the base layer may be made of polyethylene terephthalate or polyethylene naphthalate. More preferably, when polyethylene terephthalate having an intrinsic viscosity of 0.6 to 0.7 is used, weather resistance and hydrolysis resistance thereof may be more excellent. In addition, the polyester film may have a thickness of 12 to 250 μm. In the case in which the thickness is in the above-mentioned range, excellent productivity and various stacking structures may be implemented. More preferably, in the case in which an ultra-transparent polyester film having slight roughness, more specifically, a surface roughness of 10 nm or less is used, the roughness is not transferred to the coating layer.

In addition, an adhesion property may be imparted by performing corona treatment on a surface opposite to a surface of the polyester film corresponding to the base layer on which the coating layer is formed or using a different adhesive composition.

In the present invention, the coating layer, which is formed by coating and drying the aqueous coating composition containing (i) a composition containing the silane coupling agent represented by the following Chemical Formula 1 and (ii) a dispersion solution containing the inorganic particles, may be formed by the in-line coating method. The aqueous coating composition does not include a binder, such as a polymer.

[Chemical Formula 1]

In Chemical Formula 1, X is the straight-chain, branched-chain, or cyclic $C_1$-$C_{12}$ hydrocarbon group having one or at least two functional groups selected from the vinyl group, the epoxy group, the amino group, the methacrylic group, the acrylic group, and the mercapto group and $R_1$ to $R_3$ are each independently $C_1$-$C_5$ alkyl.

In one aspect of the present invention, the particles may be inorganic particles. In detail, the inorganic particles may be any one or at least two selected from the group consisting of silica, alumina, zirconia, and titania particles, but are not necessarily limited thereto. An average particle size of the particles is not particularly limited, but may be in a range of 10 to 200 nm, more preferably 50 to 200 nm, which is preferable in that the coating layer suitable for being used as a transfer film may be formed, and the coating layer may be formed by the in-line coating method.

The particles may be contained in the coating layer at a content of 10 to 90 wt %, more preferably 20 to 50 wt %, and the other ingredients may be composed of the silane coupling agent and an additive. In the case in which the content of the particles is less than 10 wt %, the surface roughness is significantly low, such that a winding defect and a blocking problem may occur, and in the case in which the content is more than 90 wt %, haze may be rapidly increased, or aggregation of the particles may be generated.

In Chemical Formula 1, X is a functional group chemically binding to organic materials such as various synthetic resins, or the like, and an alkoxy moiety represented by OR1 to OR3 is a functional group chemically binding to inorganic materials such as glass, metals, or the like.

A reaction mechanism of the silane coupling agent represented by Chemical Formula 1 will be described. An alkoxysilyl group (Si—OR) of the silane coupling agent is hydrolyzed by water or moisture to thereby be converted into a silanol group (Si—OH), and this silanol group and a surface of an inorganic material form a Si—O-M bond (M means in organic material) by a condensation reaction. X, which is another functional group, binds to or is compatibilized with an organic material to thereby chemically bind the inorganic material and the organic material to each other.

That is, the aqueous coating composition may contain the alcohol based solvent or water for performing hydrolysis or the condensation reaction, and preferably, the case of using water is advantageous for being applied to the in-line coating process. In the case of using the alcohol based solvent, a quick drying solvent having good volatility such as isopropanol, N-propanol, or the like, may be used.

The alkyl includes both of the straight-chain and branched-chain alkyls, and more specifically, in Chemical Formula 1, $R_1$ to $R_3$ may be each independently ethyl or methyl.

In more detail, the silane coupling agent represented by Chemical Formula 1 may be any one or at least two selected from the group consisting of [3-(2-aminoethylamino)propyl]trimethoxysilane, N-(2-aminoethyl-3-aminopropyl)triethoxysilane, vinyltrimethoxysilane, vinyltriethoxysilane, 3-acryloxypropyltrimethoxysilane, 3-acryloxypropyltriethoxysilane, 3-(meth)acryloxypropyltrimethoxysilane, 3-(meth)acryloxypropyltriethoxysilane, 3-(meth)acryloxypropyltripropoxysilane, 3-aminopropyltrimethoxysilane, and 3-aminopropyltriethoxysilane, but is not necessarily limited thereto.

According to the present invention, it is possible to attach the inorganic particles to the base layer made of the polyester resin using the silane coupling agent, and to implement an excellent releasing property from an adhered surface to which the polyester film according to the present invention will be adhered. That is, in the case of coating the inorganic particles on the base layer using a binder resin, an adhesion property between the binder resin and the adhered surface to which the film will be adhered, more specifically, a hard coating layer is strong, such that the releasing property may be deteriorated, but in the polyester film according to the present invention, the releasing property may be further improved by using the silane coupling agent.

Further, the coating layer is formed using the aqueous coating composition containing the silane coupling agent, the inorganic particles, and water by the in-line coating method, such that the adhesion property to the polyester base layer may be excellent, and a significantly thin coating layer may be formed.

In this case, dispersibility between the silane coupling agent and the inorganic particles may be further improved by adjusting the pH of the aqueous coating composition, such that the inorganic particles may be uniformly dispersed in the coating layer. Dispersibility is improved, which is preferable in that the releasing property may be further improved. Therefore, in the polyester film according to the present invention, the coating layer stacked on one surface or both surfaces of the base layer made of the polyester resin is formed using the aqueous coating composition containing the silane coupling agent represented by Chemical Formula 1 and the particles, but a pH difference between the particles and the aqueous coating composition may be less than 3, more preferably, less than 2.

In general, the particles are purchased in a form of a dispersion solution containing the particles, but as a result of study of the present inventors, it was found that dispersibility of a particle dispersion solution may be further improved by adding a pH adjusting agent at the time of preparing the aqueous coating composition. Further, it was found that in the case of injecting the particles when an acidic or alkaline environment is stably formed after adjusting a pH of a composition added at the time of preparing the aqueous coating composition in accordance with a pH of the particle dispersion solution, the dispersibility of the particles may be further improved. In this case, an excellent releasing property as well as the transferring property may be implemented by a combination with other ingredients, and a surface may become uniform and smooth.

In detail, it is preferable that when the pH of the particle is alkaline, the aqueous coating composition contains a pH adjusting agent for adjusting a pH of the entire composition to 8 or more, and when the pH of the particle is acidic, the aqueous coating composition contains a pH adjusting agent for adjusting the pH of the entire composition to 5 or less. Since a pH of the silane coupling agent represented by Chemical Formula 1 is strongly alkaline, only when a pH until just before the particles are injected in a preparation procedure of the composition is adjusted to be acidic or alkaline environment, the composition having excellent dispersibility of the particles may be prepared, and the roughness of the coating layer may be decreased.

More specifically, in the case in which the pH of the particles used in the aqueous coating composition is alkaline, a tetraalkyl ammonium salt may be used as the pH adjusting agent in order to adjust the pH to 8 or more. For example, tetramethyl ammonium hydroxide, tetraethyl ammonium hydroxide, or the like, may be used, but the pH adjusting agent is not limited thereto.

Further, in the case in which the pH of the particles is acidic, formic acid, sulfuric acid, nitric acid, hydrochloric acid, citric acid, maleic acid, malic acid, lactic acid, oxalic acid, phthalic acid, succinic acid, or the like, may be used as the pH adjusting agent in order to adjust the pH of the entire composition to 5 or less, but the pH adjusting agent is not limited thereto.

In addition, if necessary, the aqueous coating composition may further contain additives such as a wetting agent, a slip agent, a UV stabilizer, a dispersant, or the like.

The coating layer may be coated by the in-line coating method to thereby have a dried coating thickness of 10 to 500 nm, but is not limited thereto. In the case in which the dried coating thickness is less than 10 nm, a slip property may not be implemented, and in the case in which the dried coating thickness is more than 500 nm, blocking between the films may be generated.

In more detail, the aqueous coating composition may contain 0.1 to 0.5 wt % of the silence coupling agent, 0.001 to 0.1 wt % of the particles, 0.1 to 2 wt % of the wetting agent, and the rest water. In addition, if necessary, the pH adjusting agent may be further contained in order to make the same pH environment as that of the particles so that the particles may be uniformly dispersed.

It is preferable that the silane coupling agent is used at a content of 0.1 to 0.5 wt % in the entire aqueous coating composition, and in the case in which the content is less than 0.1 wt %, it is impossible to fix the particles, and in the case in which the content is more than 0.5 wt %, coating appearance may not be excellent.

It is preferable that the particles are used at a content of 0.001 to 0.1 wt % in the entire aqueous coating composition, and in the case in which the content is less than 0.001 wt %, the slip property may be deteriorated and a blocking problem may occur, and in the case in which the content is more than 0.1 wt %, haze may be rapidly increased.

The wetting agent is used to allow emulsion to be uniformly coated on the polyester film, and one selected from polyethylene glycol, polyethylene ester, modified silicon, fluorine mixtures, and the like, is used, which is preferable in view of significantly improving a coating property. Further, in view of an excellent adhesion property, it is preferable that the wetting agent is used at a content of 0.1 to 2 wt % in the entire aqueous coating composition.

The pH adjusting agent, which is used to improve dispersibility of the particles in the aqueous coating composition, may be used at a content for making the same pH environment as that of the particles.

In addition, the present invention provides a manufacturing method of a polyester film including:

a) melt-extruding a polyester resin to manufacture a polyester sheet;

b) stretching the polyester sheet in a machine direction;

c) coating an aqueous coating composition containing (i) a composition containing a silane coupling agent represented by the following Chemical Formula 1 and (ii) a dispersion solution containing inorganic particles on one surface or both surfaces of the polyester sheet stretched in the machine direction to form a coating layer and stretching the coated polyester sheet in a transverse direction, wherein said aqueous coating composition and the resulting coating layer do not include a polymer binder resin; and d) heat-setting the bi-axially stretched polyester film.

[Chemical Formula 1]

In Chemical Formula 1, X is a straight-chain, branched-chain, or cyclic $C_1$-$C_{12}$ hydrocarbon group having one or at least two functional groups selected from a vinyl group, an epoxy group, an amino group, a methacrylic group, an acrylic group, and a mercapto group, and $R_1$ to $R_3$ are each independently $C_1$-$C_5$ alkyl.

Further, the manufacturing method of a polyester film may further include, after step d), performing corona treatment on a surface opposite to a surface of the polyester film on which a coating layer is formed. The corona treatment is to further improve a printing property and any corona treatment method may be used as long as it is generally used in the art.

Step a) is a process of melt-extruding the resin from a cylinder to manufacture the sheet through a T-die in order to manufacture the polyester film.

Step b) is a process of bi-axially stretching the polyester sheet in order to manufacture the polyester film, and the stretching in the machine direction may be preferably performed using at least one roller.

Next, in step c), the coating layer is formed by an in-line coating method. In this case, water dispersion emulsion may be preferably used so as to be used in the in-line coating. In this case, a configuration of the aqueous coating composition for forming the coating layer may be the same as described above, and preferably, the aqueous coating composition may be coated so that a dried coating thickness after stretching becomes 10 to 500 nm at the time of coating. After the coating layer is formed by coating the aqueous coating composition, the coated sheet may be stretched in the transverse direction. In this case, it is preferable that the stretching in the transverse direction is performed using a tenter. In this case, a stretching rate may be three to four times.

Then, water used in the coating layer is removed, the coating layer is cured, and a drying and heat-setting process is performed in order to prevent the film from being shrunk. At this time, a heat-setting temperature may be 225 to 235° C.

Hereinafter, Examples will be provided in order to describe the present invention in more detail. However, the present invention is not limited to the following Examples.

Physical properties in the present invention were measured as follows.

1) Haze

Measurement device: Nippon Denshoku Kogyo Co. LTD., NDH-5000, ASTM mode (ASTM D-1003)

Measuring method: After measuring haze of a coating sample three times, and an average value was calculated.

2) Crude Liquid Stability

Crude liquid stability was evaluated by testing whether or not a crude liquid was changed or aggregation of particles was generated when the crude liquid was kept at room temperature and humidity for 12 hours or more on the scene.

◯: Coating appearance and dispersibility of the particles were similar before and after keeping the crude liquid x: There was changes in coating appearance and dispersibility of the particles before and after keeping the crude liquid 3) Dispersibility of Particles Dispersibility of the particles in the coating layer was evaluated by measuring the number of aggregated particles (N number (N=5)) using a scanning electron microscope (SEM). At the time of confirming the aggregated particles at a magnification of 10,000-fold by the naked eyes, the case in which the number of aggregated particles having a particle size of 300 nm was 5 or more was evaluated to have generated aggregated particles, and the case in which the number of aggregated particles was less than 5 was evaluated to have not generated aggregated particles. Here, in the case in which the number of aggregated particles having a particle size of 300 nm was 5 or more, dispersibility was not good. In this case, a releasing property may be deteriorated.

4) Releasing Property

After an acrylic hard coating composition was applied onto a polyvinyl chloride film, in a state in which films manufactured in Examples and Comparative Examples were stacked and compressed thereon, the hard coating layer was formed by curing the hard coating composition. Then, the films manufactured in Examples and Comparative Examples were removed, thereby evaluating the releasing property as follows.

◯: The film was cleanly delaminated without a reaction with the hard coating composition x: The film was reacted with the hard coating composition to thereby be adhered thereto instead of being laminated 5) Coating Property A coating appearance level was evaluated under a fluorescent lamp by the naked eyes.

◯: There was no pinhole and a coating surface was clean x: There was pinholes and the coating surface was entirely opaque 6) Ink Adhesion Property After writing words on a coating surface using a Name pen, a 3M tape was attached thereon, and rubbing was performed thereon two times using a rubber roll (2 kg). Then, after 1 minute, the 3M tape was removed, and an ink adhesion property was evaluated.

In this case, the case in which ink was transferred to the 3M tape was evaluated as good, and the case in which the ink was not transferred was evaluated as poor.

Example 1

Preparation of Aqueous Coating Composition 1

0.1 wt % of silica particles (Nalco, Nalco-2329, solid content: 40 wt %, particle size: 80 nm, pH: 8.2 to 8.6) were added and uniformly dispersed in a state in which an alkaline environment was stably formed by mixing 0.23 wt % of a silane coupling agent (Dow Corning Korea Ltd., Z-6020, solid content: 1 wt %), 1 wt % of a wetting agent (3M Ltd., FC-4432, solid content: 10 wt %), 0.05 wt % of tetraethyl ammonium hydroxide as a pH adjusting agent, and 98.62 wt % of water with each other and adjusting a pH to 10.

Manufacturing of Polyester Film

After a polyethylene terephthalate chip from which moisture was removed to have a content of 100 ppm or less was injected into a melt-extruder and melted, the resultant was rapidly cooled and solidified by a casting drum having a surface temperature of 20° C. while being extruded through a T-die, thereby manufacturing a polyethylene terephthalate sheet having a thickness of 2000 μm.

The manufactured polyethylene terephthalate sheet was stretched 3.5 times in the machine direction (MD) at 110° C. and cooled at room temperature. Next, after the aqueous coating composition 1 was coated on one surface of the sheet by a bar coating method, the stretched sheet was preheated, dried, and then stretched 3.5 times in a transverse direction (TD) at 140° C. Then, after thermal treatment was performed in a 5-stage tenter at 235° C., the thermally treated film was relaxed by 10% in the machine and transverse directions to be heat-set at 200° C., thereby manufacturing a bi-axially stretched film including a coating layer formed on one surface thereof and having a thickness of 100 μm. The coating layer had a dried coating thickness of 75 nm after stretching. The physical properties of the film obtained as described above were shown in the following Table 1.

Example 2

Preparation of Aqueous Coating Composition 2

0.1 wt % of silica particles (AcenanoChem, AS-80K, solid content: 20 wt %, particle size: 80 nm, pH: 10 to 11.5) were added and uniformly dispersed in a state in which an alkaline environment was stably formed by mixing 0.23 wt % of a silane coupling agent (Dow Corning Korea Ltd., Z-6020, solid content: 1 wt %), 1 wt % of a wetting agent (3M Ltd., FC-4432, solid content: 10 wt %), 0.05 wt % of tetraethyl ammonium hydroxide as a pH adjusting agent, and 98.62 wt % of water with each other and adjusting a pH to 10.

Manufacturing of Polyester Film

After a polyethylene terephthalate chip from which moisture was removed to have content of 100 ppm or less was injected into a melt-extruder and melted, the resultant was rapidly cooled and solidified by a casting drum having a surface temperature of 20° C. while being extruded through a T-die, thereby manufacturing a polyethylene terephthalate sheet having a thickness of 2000 μm.

The manufactured polyethylene terephthalate sheet was stretched 3.5 times in the machine direction (MD) at 110° C. and cooled at room temperature. Next, after the aqueous coating composition 2 was coated on one surface of the sheet by a bar coating method, the stretched sheet was preheated, dried, and then stretched 3.5 times in a transverse direction (TD) at 140° C. Then, after thermal treatment was performed in a 5-stage tenter at 235° C., the thermally treated film was relaxed by 10% in the machine and transverse directions to be heat-set at 200° C., thereby manufacturing a bi-axially stretched film including a coating layer formed on one surface thereof and having a thickness of 100 μm. The coating layer had a dried coating thickness of 75 nm after stretching. The physical properties of the film obtained as described above were shown in the following Table 1.

Example 3

Preparation of Aqueous Coating Composition 3

0.1 wt % of silica particles (Nissan, ST-YL, solid content: 38.2 wt %, particle size: 50 to 80 nm, pH: 9.6) were added and uniformly dispersed in a state in which an alkaline environment was stably formed by mixing 0.23 wt % of a silane coupling agent (Dow Corning Korea Ltd., Z-6020, solid content: 1 wt %), 1 wt % of a wetting agent (3M Ltd., FC-4432, solid content: 10 wt %), 0.05 wt % of tetraethyl ammonium hydroxide as a pH adjusting agent, and 98.62 wt % of water with each other and adjusting a pH to 10.

Manufacturing of Polyester Film

After a polyethylene terephthalate chip from which moisture was removed to have content of 100 ppm or less was injected into a melt-extruder and melted, the resultant was rapidly cooled and solidified by a casting drum having a surface temperature of 20° C. while being extruded through a T-die, thereby manufacturing a polyethylene terephthalate sheet having a thickness of 2000 μm.

The manufactured polyethylene terephthalate sheet was stretched 3.5 times in the machine direction (MD) at 110° C. and cooled at room temperature. Next, after the aqueous coating composition 3 was coated on one surface of the sheet by a bar coating method, the stretched sheet was preheated, dried, and then stretched 3.5 times in a transverse direction (TD) at 140° C. Then, after thermal treatment was performed in a 5-stage tenter at 235° C., the thermally treated film was relaxed by 10% in the machine and transverse directions to be heat-set at 200° C., thereby manufacturing a bi-axially stretched film including a coating layer formed on one surface thereof and having a thickness of 100 μm. The coating layer had a dried coating thickness of 75 nm after stretching. The physical properties of the film obtained as described above were shown in the following Table 1.

Example 4

Preparation of Aqueous Coating Composition 4

0.1 wt % of silica particles (Nissan, ST-ZL, solid content: 38.7 wt %, particle size: 70 to 100 nm, pH: 9.3) were added and uniformly dispersed in a state in which an alkaline environment was stably formed by 0.23 wt % of a silane coupling agent (Dow Corning Korea Ltd., Z-6020, solid content: 1 wt %), 1 wt % of a wetting agent (3M Ltd., FC-4432, solid content: 10 wt %), 0.05 wt % of tetraethyl ammonium hydroxide as a pH adjusting agent, and 98.62 wt % of water with each other and adjusting a pH to 10.

Manufacturing of Polyester Film

After a polyethylene terephthalate chip from which moisture was removed to have content of 100 ppm or less was injected into a melt-extruder and melted, the resultant was rapidly cooled and solidified by a casting drum having a surface temperature of 20° C. while being extruded through a T-die, thereby manufacturing a polyethylene terephthalate sheet having a thickness of 2000 μm.

The manufactured polyethylene terephthalate sheet was stretched 3.5 times in a machine direction (MD) at 110° C. and cooled at room temperature. Next, after the aqueous coating composition 4 was coated on one surface of the sheet by a bar coating method, the stretched sheet was preheated, dried, and then stretched 3.5 times in a transverse direction (TD) at 140° C. Then, after thermal treatment was performed in a 5-stage tenter at 235° C., the thermally treated film was relaxed by 10% in the machine and transverse directions to be heat-set at 200° C., thereby manufacturing a bi-axially stretched film including a coating layer formed on one surface thereof and having a thickness of 100 μm. The coating layer had a dried coating thickness of 75 nm after stretching. The physical properties of the film obtained as described above were shown in the following Table 1.

Example 5

Preparation of Aqueous Coating Composition 5

0.1 wt % of silica particles (Nissan, ST-AK-YL, solid content: 30 to 31 wt %, particle size: 50 to 80 nm, pH: 3 to 5) were added and uniformly dispersed in a state in which an acidic environment was stably formed by mixing 0.23 wt % of a silane coupling agent (Dow Corning Korea Ltd., Z-6020, solid content: 1 wt %), 1 wt % of a wetting agent (3M Ltd., FC-4432, solid content: 10 wt %), 0.05 wt % of formic acid as a pH adjusting agent, and 98.62 wt % of water with each other and adjusting a pH to 4.

Manufacturing of Polyester Film

After a polyethylene terephthalate chip from which moisture was removed to have content of 100 ppm or less was injected into a melt-extruder and melted, the resultant was rapidly cooled and solidified by a casting drum having a surface temperature of 20° C. while being extruded through a T-die, thereby manufacturing a polyethylene terephthalate sheet having a thickness of 2000 μm.

The manufactured polyethylene terephthalate sheet was stretched 3.5 times in a machine direction (MD) at 110° C. and cooled at room temperature. Next, after the aqueous coating composition 5 was coated on one surface of the sheet by a bar coating method, the stretched sheet was preheated, dried, and then stretched 3.5 times in a transverse direction (TD) at 140° C. Then, after thermal treatment was performed in a 5-stage tenter at 235° C., the thermally treated film was relaxed by 10% in the machine and transverse directions to be heat-set at 200° C., thereby manufacturing a bi-axially stretched film including a coating layer formed on one surface thereof and having a thickness of 100 μm. The coating layer had a dried coating thickness of 75 nm after stretching. The physical properties of the film obtained as described above were shown in the following Table 1.

Comparative Example 1

Preparation of Aqueous Coating Composition 6

0.1 wt % of silica particles (Nissan, ST-AK-YL, solid content: 30 to 31 wt %, particle size: 50 to 80 nm, pH: 3 to 5) were added and uniformly dispersed in a state in which an alkaline environment was stably formed by mixing 0.23 wt % of a silane coupling agent (Dow Corning Korea Ltd., Z-6020, solid content: 1 wt %), 1 wt % of a wetting agent (3M Ltd., FC-4432, solid content: 10 wt %), 0.05 wt % of tetraethyl ammonium hydroxide as a pH adjusting agent, and 98.62 wt % of water with each other and adjusting a pH to 10.

Manufacturing of Polyester Film

After a polyethylene terephthalate chip from which moisture was removed to have content of 100 ppm or less was injected into a melt-extruder and melted, the resultant was rapidly cooled and solidified by a casting drum having a surface temperature of 20° C. while being extruded through a T-die, thereby manufacturing a polyethylene terephthalate sheet having a thickness of 2000 μm.

The manufactured polyethylene terephthalate sheet was stretched 3.5 times in a machine direction (MD) at 110° C. and cooled at room temperature. Next, after the aqueous coating composition 6 was coated on one surface of the sheet by a bar coating method, the stretched sheet was preheated, dried, and then stretched 3.5 times in a transverse direction (TD) at 140° C. Then, after thermal treatment was performed in a 5-stage tenter at 235° C., the thermally treated film was relaxed by 10% in the machine and transverse directions to be heat-set at 200° C., thereby manufacturing a bi-axially stretched film including a coating layer formed on one surface thereof and having a thickness of 100 μm. The coating layer had a dried coating thickness of 75 nm after stretching. The physical properties of the film obtained as described above were shown in the following Table 1.

Comparative Example 2

Preparation of Aqueous Coating Composition 7

After 0.23 wt % of a silane coupling agent (Dow Corning Korea Ltd., Z-6020, solid content: 1 wt %), 1 wt % of a wetting agent (3M Ltd., FC-4432, solid content: 10 wt %), and 98.67 wt % of water were mixed with each other, when a pH was 8, 0.1 wt % of silica particles (Nissan, ST-AK-YL, solid content: 30 to 31 wt %, particle size: 50 to 80 nm, pH: 3 to 5) were added and uniformly dispersed.

Manufacturing of Polyester Film

After a polyethylene terephthalate chip from which moisture was removed to have content of 100 ppm or less was injected into a melt-extruder and melted, the resultant was rapidly cooled and solidified by a casting drum having a surface temperature of 20° C. while being extruded through a T-die, thereby manufacturing a polyethylene terephthalate sheet having a thickness of 2000 μm.

The manufactured polyethylene terephthalate sheet was stretched 3.5 times in a machine direction (MD) at 110° C. and cooled at room temperature. Next, after the aqueous coating composition 7 was coated on one surface of the sheet by a bar coating method, the stretched sheet was preheated, dried, and then stretched 3.5 times in a transverse direction (TD) at 140° C. Then, after thermal treatment was performed in a 5-stage tenter at 235° C., the thermally treated film was relaxed by 10% in the machine and transverse directions to be heat-set at 200° C., thereby manufacturing a bi-axially stretched film including a coating layer formed on one surface thereof and having a thickness of 100 μm. The coating layer had a dried coating thickness of 75 nm after stretching. The physical properties of the film obtained as described above were shown in the following Table 1.

Comparative Example 3

Preparation of Aqueous Coating Composition 8

0.1 wt % of silica particles (Nalco, Nalco-2329, solid content: 40 wt %, particle size: 80 nm, pH: 8.2 to 8.6) were added and uniformly dispersed in a state in which an acidic environment was stably formed by mixing 0.23 wt % of a silane coupling agent (Dow Corning Korea Ltd., Z-6020, solid content: 1 wt %), 1 wt % of a wetting agent (3M Ltd., FC-4432, solid content: 10 wt %), 0.05 wt % of formic acid as a pH adjusting agent, and 98.62 wt % of water with each other and adjusting a pH to 4.

Manufacturing of Polyester Film

After a polyethylene terephthalate chip from which moisture was removed to have content of 100 ppm or less was injected into a melt-extruder and melted, the resultant was rapidly cooled and solidified by a casting drum having a surface temperature of 20° C. while being extruded through a T-die, thereby manufacturing a polyethylene terephthalate sheet having a thickness of 2000 μm.

The manufactured polyethylene terephthalate sheet was stretched 3.5 times in a machine direction (MD) at 110° C. and cooled at room temperature. Next, after the aqueous coating composition 8 was coated on one surface of the sheet by a bar coating method, the stretched sheet was preheated, dried, and then stretched 3.5 times in a transverse direction (TD) at 140° C. Then, after thermal treatment was performed in a 5-stage tenter at 235° C., the thermally treated film was relaxed by 10% in the machine and transverse directions to be heat-set at 200° C., thereby manufacturing a bi-axially stretched film including a coating layer formed on one surface thereof and having a thickness of 100 μm. The coating layer had a dried coating thickness of 75 nm after stretching. The physical properties of the film obtained as described above were shown in the following Table 1.

Comparative Example 4

Preparation of Aqueous Coating Composition 9

After 4 wt % of a urethane binder (DKS, H-3, solid content: 1 wt %), 1 wt % of a wetting agent (3M Ltd., FC-4432, solid content: 10 wt %), and 94.9 wt % of water were mixed with each other, 0.1 wt % of silica particles (Nissan, ST-AK-YL, solid content: 30 to 31 wt %, particle size: 50 to 80 nm, pH: 3 to 5) were added and uniformly dispersed.

Manufacturing of Polyester Film

After a polyethylene terephthalate chip from which moisture was removed to have content of 100 ppm or less was injected into a melt-extruder and melted, the resultant was rapidly cooled and solidified by a casting drum having a surface temperature of 20° C. while being extruded through a T-die, thereby manufacturing a polyethylene terephthalate sheet having a thickness of 2000 μm.

The manufactured polyethylene terephthalate sheet was stretched 3.5 times in a machine direction (MD) at 110° C. and cooled at room temperature. Next, after the aqueous coating composition 9 was coated on one surface of the sheet by a bar coating method, the stretched sheet was preheated, dried, and then stretched 3.5 times in a transverse direction (TD) at 140° C. Then, after thermal treatment was performed in a 5-stage tenter at 235° C., the thermally treated film was relaxed by 10% in the machine and transverse directions to be heat-set at 200° C., thereby manufacturing a bi-axially stretched film including a coating layer formed on one surface thereof and having a thickness of 100 μm. The coating layer had a dried coating thickness of 90 nm after stretching.

The physical properties of the film obtained as described above were shown in the following Table 1.

Comparative Example 5

Preparation of Aqueous Coating Composition 10

After 2.27 wt % of an acrylic binder (Rohm&Haas, P-3208, solid content: 1 wt %), 1 wt % of a wetting agent (3M Ltd., FC-4432, solid content: 10 wt %), and 96.63 wt % of water were mixed with each other, 0.1 wt % of silica particles (Nissan, ST-AK-YL, solid content: 30 to 31 wt %, particle size: 50 to 80 nm, pH: 3 to 5) were added and uniformly dispersed.

Manufacturing of Polyester Film

After a polyethylene terephthalate chip from which moisture was removed to have content of 100 ppm or less was injected into a melt-extruder and melted, the resultant was rapidly cooled and solidified by a casting drum having a surface temperature of 20° C. while being extruded through a T-die, thereby manufacturing a polyethylene terephthalate sheet having a thickness of 2000 μm.

The manufactured polyethylene terephthalate sheet was stretched 3.5 times in a machine direction (MD) at 110° C. and cooled at room temperature. Next, after the aqueous coating composition 10 was coated on one surface of the sheet by a bar coating method, the stretched sheet was preheated, dried, and then stretched 3.5 times in a transverse direction (TD) at 140° C. Then, after thermal treatment was performed in a 5-stage tenter at 235° C., the thermally treated film was relaxed by 10% in the machine and transverse directions to be heat-set at 200° C., thereby manufacturing a bi-axially stretched film including a coating layer formed on one surface thereof and having a thickness of 100 μm. The coating layer had a dried coating thickness of 90 nm after stretching. The physical properties of the film obtained as described above were shown in the following Table 1.

TABLE 1

|  |  | Example 1 | Example 2 | Example 3 | Example 4 | Example 5 |
| --- | --- | --- | --- | --- | --- | --- |
| pH | Composition | 10 | 10 | 10 | 10 | 4 |
|  | Particles | 8.2~8.6 | 10~11.5 | 9.6 | 9.3 | 3~5 |
|  | \|pH of Composition − pH of Particles\| | 1.4~1.8 | 0~1.5 | 0.4 | 0.7 | 0~1 |
|  | Haze (%) | 0.63 | 0.61 | 0.60 | 0.66 | 0.62 |
|  | Coating Property | ○ | ○ | ○ | ○ | ○ |
|  | Crude Liquid Stability | ○ | ○ | ○ | ○ | ○ |

TABLE 1-continued

Figure 1:
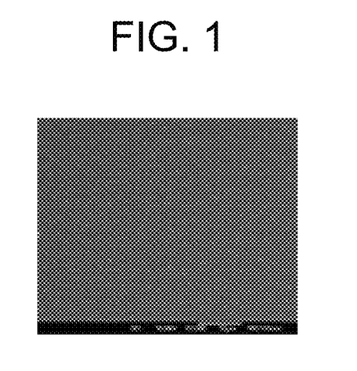
FIG. 1 is a SEM photograph image that is enlarged two thousand times in order to observe dispersibility of particles according to Example 1.
Figure 2:
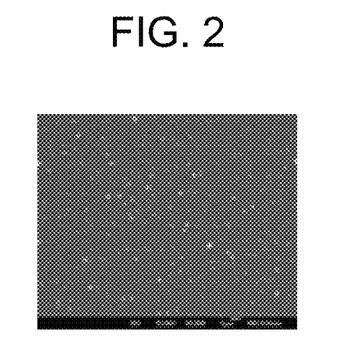
FIG. 2 is a SEM photograph image that is enlarged two thousand times in order to observe dispersibility of particles according to Example 2
Figure 3:
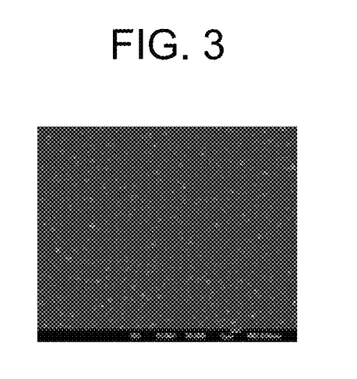
FIG. 3 is a SEM photograph image that is enlarged two thousand times in order to observe dispersibility of particles according to Example 3
Figure 4:
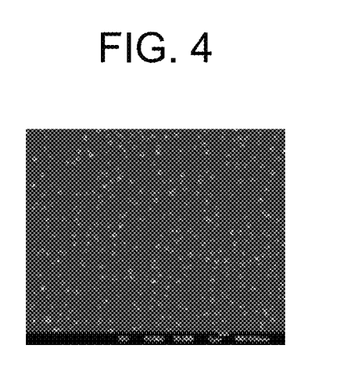
FIG. 4 is a SEM photograph image that is enlarged two thousand times in order to observe dispersibility of particles according to Example 4.
Figure 5:
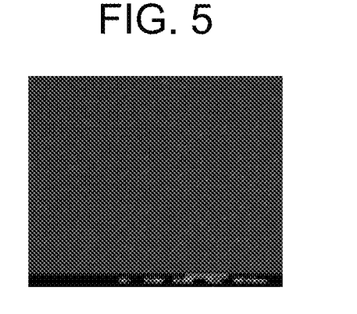
FIG. 5 is a SEM photograph image that is enlarged two thousand times in order to observe dispersibility of particles according to Example 5.
Figure 6:
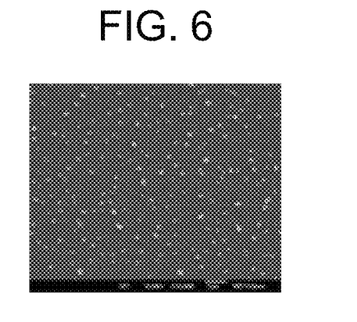
FIG. 6 is a SEM photograph image that is enlarged ten thousand times in order to observe dispersibility of particles according to Example 1.
Figure 7:
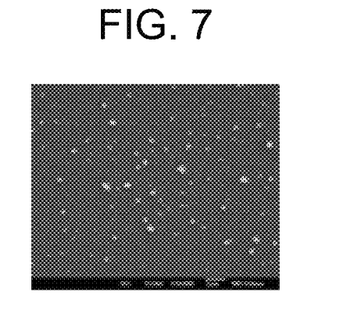
FIG. 7 is a SEM photograph image that is enlarged ten thousand times in order to observe dispersibility of particles according to Example 2.
Figure 8:
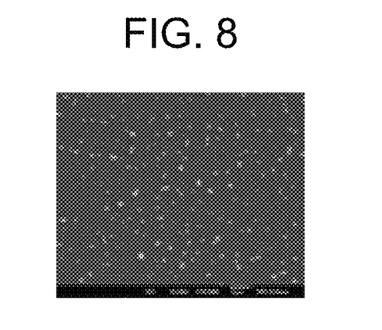
FIG. 8 is a SEM photograph image that is enlarged ten thousand times in order to observe dispersibility of particles according to Example 3.
Figure 9:
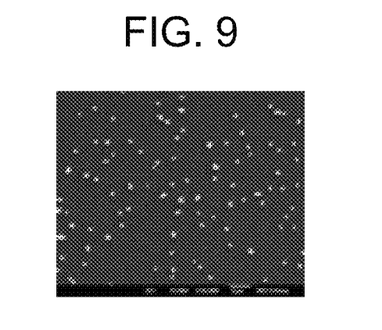
FIG. 9 is a SEM photograph image that is enlarged ten thousand times in order to observe dispersibility of particles according to Example 4.
Figure 10:
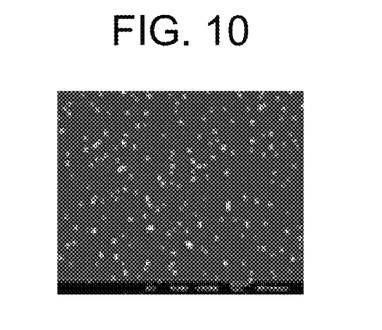
FIG. 10 is a SEM photograph image that is enlarged ten thousand times in order to observe dispersibility of particles according to Example 5.

|  |  | Example 1 | Example 2 | Example 3 | Example 4 | Example 5 |
|---|---|---|---|---|---|---|
| SEM (See FIGS. 1 to 10) | 2000-fold | FIG. 1 | FIG. 2 | FIG. 3 | FIG. 4 | FIG. 5 |
|  | 10000-fold | FIG. 6 | FIG. 7 | FIG. 8 | FIG. 9 | FIG. 10 |
|  | Whether or not aggregation of particles is generated? | No | No | No | No | No |
|  | Number of aggregated particles (n = 5) | 2 | 4 | 2 | 2 | 3 |
| Releasing Property |  | ○ | ○ | ○ | ○ | ○ |
| Ink Adhesion Property |  | Good | Good | Good | Good | Good |

Figure 11:
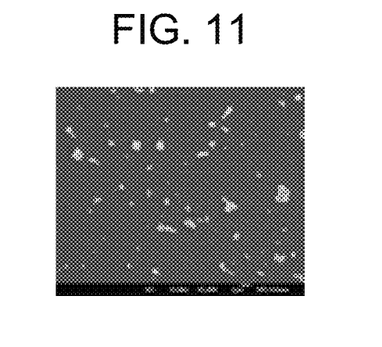
FIG. 11 is a SEM photograph image that is enlarged two thousand times in order to observe dispersibility of particles according to Comparative Example 1.
Figure 12:
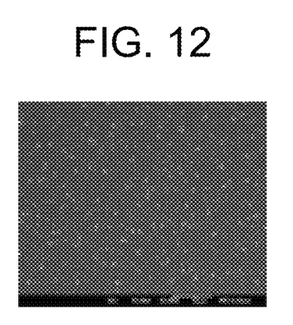
FIG. 12 is a SEM photograph image that is enlarged two thousand times in order to observe dispersibility of particles according to Comparative Example 2.
Figure 13:
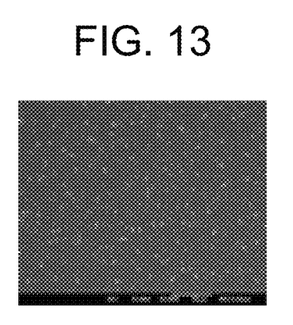
FIG. 13 is a SEM photograph image that is enlarged two thousand times in order to observe dispersibility of particles according to Comparative Example 3.
Figure 14:
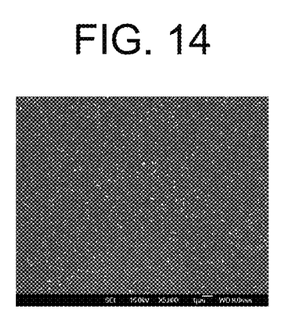
FIG. 14 is a SEM photograph image that is enlarged two thousand times in order to observe dispersibility of particles according to Comparative Example 4.
Figure 15:
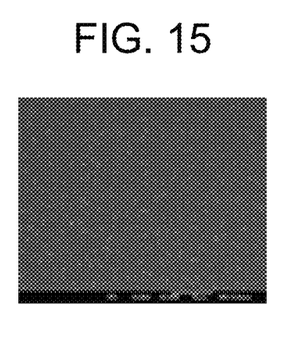
FIG. 15 is a SEM photograph image that is enlarged two thousand times in order to observe dispersibility of particles according to Comparative Example 5.
Figure 16:
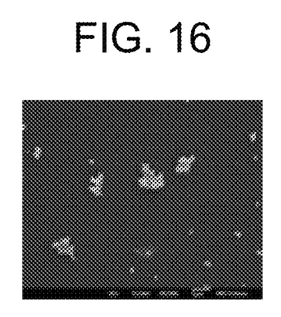
FIG. 16 is a SEM photograph image that is enlarged ten thousand times in order to observe dispersibility of particles according to Comparative Example 1.
Figure 17:
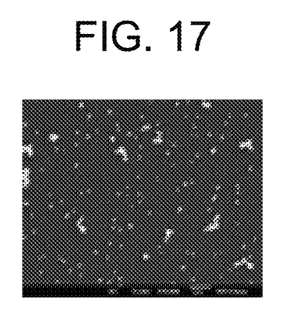
FIG. 17 is a SEM photograph image that is enlarged ten thousand times in order to observe dispersibility of particles according to Comparative Example 2.
Figure 18:
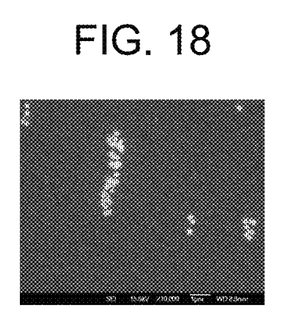
FIG. 18 is a SEM photograph image that is enlarged ten thousand times in order to observe dispersibility of particles according to Comparative Example 3.
Figure 19:
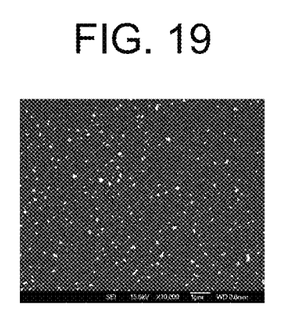
FIG. 19 is a SEM photograph image that is enlarged ten thousand times in order to observe dispersibility of particles according to Comparative Example 4.
Figure 20:
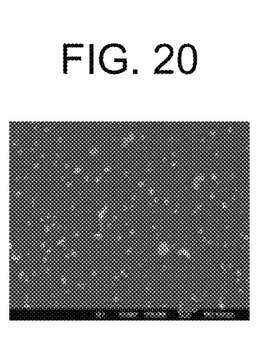
FIG. 20 is a SEM photograph image that is enlarged ten thousand times in order to observe dispersibility of particles according to Comparative Example 5.

|  |  | Comparative Example 1 | Comparative Example 2 | Comparative Example 3 | Comparative Example 4 | Comparative Example 5 |
|---|---|---|---|---|---|---|
| pH | Composition | 10 | 8 | 4 | — | — |
|  | Particles | 3~5 | 3~5 | 8.2~8.6 | 3~5 | 3~5 |
|  | \|pH of Composition − pH of Particles\| | 5~7 | 3~5 | 4.2~4.6 | — | — |
| Haze (%) |  | 0.75 | 0.66 | 0.71 | 0.78 | 0.81 |
| Coating Property |  | ○ | ○ | ○ | ○ | ○ |
| Crude Liquid Stability |  | ○ | ○ | ○ | ○ | ○ |
| SEM (See FIGS. 11 to 20) | 2000-fold | FIG. 11 | FIG. 12 | FIG. 13 | FIG. 14 | FIG. 15 |
|  | 10000-fold | FIG. 16 | FIG. 17 | FIG. 18 | FIG. 19 | FIG. 20 |
|  | Whether or not aggregation of particles is generated? | Yes | Yes | Yes | No | No |
|  | Number of aggregated particles (n = 5) | 13 | 16 | 15 | 3 | 4 |
| Releasing Property |  | x | x | x | x | x |
| Ink Adhesion Property |  | Good | Good | Good | Poor | Poor |

As shown in Table 1, in Comparative Examples 1 to 3, the pH of the aqueous coating composition was different from the pH of the particles, such that aggregation of the particles was generated. On the contrary, it was confirmed that in Examples 1 to 5, aggregation of the particles was not generated by adjusting the pH of the aqueous coating composition and the pH of the particles to be equal to each other, and the releasing property was also excellent. Meanwhile, it was confirmed that in Comparative Examples 4 and 5 corresponding to the cases in which the urethane binder or acrylic binder was applied instead of the silane coupling agent, a degree of dispersion of the particles was good, but the coating thickness was increased by 20% as compared to the cases of using the silane coupling agent, such that the haze was high, the releasing property was decreased, and adhesion force was rather generated.

Hereinabove, although the present invention is described by exemplary embodiments, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A polyester transfer film comprising:
   a base layer made of a polyester resin; and
   a release coating layer stacked on one surface or both surfaces of the base layer,
   wherein the release coating layer is formed by coating an aqueous coating composition including (a) a composition containing a silane coupling agent of the following Chemical Formula 1 and water, and (b) a dispersion solution containing inorganic particles on the base layer, and drying the coated composition, wherein said aqueous coating composition and said release coating layer do not include a polymer binder resin, and
   wherein a pH difference between (a) the composition containing a silane coupling agent and water and (b) the dispersion solution containing inorganic particles is less than 3, and the aqueous coating composition has a pH of 8 or more or 5 or less, Chemical Formula 1 wherein X is a straight-chain, branched-chain, or cyclic $C_1$-$C_{12}$ hydrocarbon group having one or at least two functional groups selected from a vinyl group, an epoxy group, an amino group, a methacrylic group, an acrylic group, and a mercapto group, and $R_1$ to $R_3$ are each independently a $C_1$-$C_5$ alkyl.

2. The polyester transfer film of claim 1, wherein the release coating layer contains 10 to 90 wt % of the inorganic particles.

3. The polyester transfer film of claim 1, wherein the inorganic particles have an average particle size of 10 to 200 nm and are any one or at least two inorganic particles selected from the group consisting of silica, alumina, zirconia, and titania particles.

4. The polyester transfer film of claim 1, wherein the silane coupling agent of Chemical Formula 1 is any one or at least two selected from the group consisting of [3-(2-aminoethylamino)propyl]trimethoxysilane, N-(2-aminoethyl-3-aminopropyl)triethoxysilane, vinyltrimethoxysilane, vinyltriethoxysilane, 3-acryloxypropyltrimethoxysilane, 3-acryloxypropyltriethoxysilane, 3-(meth)acryloxypropyltrimethoxysilane, 3-(meth)acryloxypropyltriethoxysilane, 3-(meth)acryloxypropyltripropoxysilane, 3-aminopropyltrimethoxysilane, and 3-aminopropyltriethoxysilane.

5. The polyester transfer film of claim 1, wherein the aqueous coating composition further contains an alcohol based solvent.

6. The polyester transfer film of claim 1, wherein the release coating layer is formed by an in-line coating method.

7. The polyester transfer film of claim 1, wherein the release coating layer has a dried coating thickness of 10 to 500 nm.

8. The polyester transfer film of claim 1, wherein the polyester transfer film has an entire thickness of 12 to 250 µm.

9. The polyester transfer film of claim 1, wherein the number of aggregated particles having a particle size of 300 nm or more, in the coating layer of the polyester transfer film is less than 5.

10. A manufacturing method of a polyester transfer film, the manufacturing method comprising:
    a) melt-extruding a polyester resin to manufacture a polyester sheet;
    b) stretching the polyester sheet in a machine direction;
    c) coating an aqueous coating composition including (i) a composition containing a silane coupling agent of the following Chemical Formula 1 and water, and (ii) a dispersion solution containing inorganic particles on one surface or both surfaces of the polyester sheet stretched in the machine direction to form a release coating layer and stretching the resulting coated polyester sheet in a transverse direction to give a bi-axially stretched polyester transfer film; and
    d) heat-setting the bi-axially stretched polyester transfer film,
    wherein the aqueous coating composition and the resulting release coating layer of c) do not include a polymer binder resin;
    wherein a pH difference between (i) the composition containing a silane coupling agent and water and (ii) the dispersion solution containing inorganic particles is less than 3; and
    wherein the aqueous coating composition has a pH of 8 or more or 5 or less, Chemical Formula 1 wherein X is a straight-chain, branched-chain, or cyclic $C_1$-$C_{12}$ hydrocarbon group having one or at least two functional groups selected from a vinyl group, an epoxy group, an amino group, a methacrylic group, an acrylic group, and a mercapto group, and $R_1$ to $R_3$ are each independently a $C_1$-$C_5$ alkyl.

11. The manufacturing method of claim 10, wherein the inorganic particles have an average particle size of 10 to 200 nm and are any one or at least two inorganic particles selected from the group consisting of silica, alumina, zirconia, and titania particles.

12. The manufacturing method of claim 10, wherein the silane coupling agent of Chemical Formula 1 is any one or at least two selected from the group consisting of [3-(2-aminoethylamino)propyl]trimethoxysilane, N-(2-aminoethyl-3-aminopropyl)triethoxysilane, vinyltrimethoxysilane, vinyltriethoxysilane, 3-acryloxypropyltrimethoxysilane, 3-acryloxypropyltriethoxysilane, 3-(meth)acryloxypropyltrimethoxysilane, 3-(meth)acryloxypropyltriethoxysilane, 3-(meth)acryloxypropyltripropoxysilane, 3-aminopropyltrimethoxysilane, and 3-aminopropyltriethoxysilane.

13. The manufacturing method of claim 10, wherein the aqueous coating composition further contains an alcohol based solvent.

14. The manufacturing method of claim 10, wherein the number of aggregated particles having a particle size of 300 nm or more, in the coating layer of the polyester transfer film, is less than 5.

* * * * *